United States Patent
Palanki et al.

(10) Patent No.: US 9,439,199 B2
(45) Date of Patent: *Sep. 6, 2016

(54) POWER DECISION PILOT FOR WIRELESS COMMUNICATION

(71) Applicant: QUALCOMM Incorporated, San Diego, CA (US)

(72) Inventors: Ravi Palanki, Cupertino, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/331,780

(22) Filed: Jul. 15, 2014

(65) Prior Publication Data

US 2014/0328314 A1    Nov. 6, 2014

Related U.S. Application Data

(63) Continuation of application No. 12/690,677, filed on Jan. 20, 2010, now Pat. No. 8,817,769.

(60) Provisional application No. 61/147,407, filed on Jan. 26, 2009, provisional application No. 61/147,851, filed on Jan. 28, 2009, provisional application No. 61/147,408, filed on Jan. 26, 2009, provisional application No. 61/148,110, filed on Jan. 29, 2009.

(51) Int. Cl.
*H04W 72/04* (2009.01)
*H04W 52/16* (2009.01)
(Continued)

(52) U.S. Cl.
CPC ....... *H04W 72/0473* (2013.01); *H04B 17/336* (2015.01); *H04B 17/345* (2015.01); *H04W 52/04* (2013.01); *H04W 52/16* (2013.01); *H04W 52/241* (2013.01); *H04W 52/243* (2013.01)

(58) Field of Classification Search
None
See application file for complete search history.

(56) References Cited

U.S. PATENT DOCUMENTS

| | | |
|---|---|---|
| 2004/0166887 A1 | 8/2004 | Laroia et al. |
| 2005/0094550 A1 | 5/2005 | Huh et al. |

(Continued)

FOREIGN PATENT DOCUMENTS

| | | |
|---|---|---|
| CN | 1778058 A | 5/2006 |
| CN | 101232690 A | 7/2008 |

(Continued)

OTHER PUBLICATIONS

3GPP: "3rd Generation Partnership Project;Technical Specification Group Radio Access Network;Evolved Universal Terrestrial Radio Access (E-UTRA);Physical Channels and Modulation(Release 8)" 3GPP Draft; Draft36211-850, 3rd Generation Partnership Project (3GPP), Mobile Competence Centre ; 650, Route Des Lucioles ; F-06921 Sophia-Antipolis Cedex ; France, Dec. 16, 2008, XP050316251 pp. 44-46,64.

(Continued)

*Primary Examiner* — Kodzovi Acolatse
(74) *Attorney, Agent, or Firm* — Dalei Dong

(57) ABSTRACT

Techniques for transmitting power decision pilots are described. A transmitter (e.g., a base station or a UE) may transmit a power decision pilot to indicate a transmit power level that it will use on subsequent time-frequency resources. In one design, the transmitter may determine a set of time-frequency resources to use for transmitting the power decision pilot, determine the transmit power level for the power decision pilot based on the transmit power level to use for data transmission, and transmit the power decision pilot on the set of time-frequency resources to indicate the transmit power level to use for data transmission on the subsequent time-frequency resources. A receiver (e.g., a UE or a base station) may receive power decision pilots from a set of transmitters and may estimate channel quality that the receiver can expect on the subsequent time-frequency resources based on the power decision pilots.

39 Claims, 12 Drawing Sheets

(51) Int. Cl.
*H04W 52/24* (2009.01)
*H04W 52/04* (2009.01)
*H04B 17/336* (2015.01)
*H04B 17/345* (2015.01)

(56) References Cited

U.S. PATENT DOCUMENTS

| | | | |
|---|---|---|---|
| 2006/0014542 A1* | 1/2006 | Khandekar | H04L 1/0002 455/447 |
| 2006/0281415 A1 | 12/2006 | Koyanagi | |
| 2008/0013500 A1* | 1/2008 | Laroia | H04B 7/2621 370/338 |
| 2008/0045260 A1* | 2/2008 | Muharemovic | H04W 52/286 455/522 |
| 2008/0139237 A1 | 6/2008 | Papasakellariou | |
| 2008/0318608 A1* | 12/2008 | Inoue | H04B 1/707 455/509 |
| 2010/0189093 A1 | 7/2010 | Palanki et al. | |

FOREIGN PATENT DOCUMENTS

| | | |
|---|---|---|
| CN | 101340264 A | 1/2009 |
| JP | 2008507215 | 3/2008 |
| JP | 2009004926 A | 1/2009 |
| KR | 20080073645 A | 8/2008 |
| WO | WO-2004077685 A2 | 9/2004 |
| WO | WO-2006020032 | 2/2006 |
| WO | 2007023787 A1 | 3/2007 |
| WO | WO-2007091833 A2 | 8/2007 |
| WO | 2008109162 A2 | 9/2008 |
| WO | 2009009453 A2 | 1/2009 |
| WO | WO-2009000954 A2 | 1/2009 |
| WO | WO-2009120478 A2 | 10/2009 |

OTHER PUBLICATIONS

3GPP TS 36.213 V8.5.0, "3rd Generation Partnership Project; Technical Specification Group Radio Access Network; Evolved Universal Terrestrial Radio Access (E-UTRA); Physical layer procedures (Release 8)" 3rd Generation Partnership Project (3GPP); Technicalspecification (TS), XX, XX, [Online] vol. 36.213, No. TS 36.213 V8.5.0, Dec. 1, 2008, pp. 1-74, XP002572343 Retrieved from the Internet: URL:http://www.3gpp.org/ftp/Specs/archive/36_series/36.213/> [retrieved on Feb. 25, 2010].

3GPP TSG RAN: "TS36.211 v8.5.0 Physical layer procedures (Release 8)" Dec. 22, 2008, pp. 14-15, XP002572742 Retrieved from the Internet: URL: www.3gpp.org> [retrieved on Apr. 9, 2009] p. 14.

International Search Report & Written Opinion—PCT/US2010/022136, International Search Authority—European Patent Office—Jun. 8, 2010.

Partial International Search Report—PCT/US2010/022136, International Search Authority—European Patent Office—Mar. 31, 2010.

Taiwan Search Report—TW099102164—TIPO—Feb. 23, 2014.

NTT DOCOMO, Inc., "Handling of False Detection of Semi-Persistent PDCCH", 3GPP Draft; R2-082479, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; Apr. 28, 2008, 3 Pages, XP050140163.

European Search Report—EP10701793—Search Authority—Munich—Jul. 4, 2016.

Qualcomm Europe: "Impact of Downlink CoMP on the Air Interface" 3GPP Draft; R1-090366, 3rd Generation Partnership Project (3GPP), Mobile Competence Centre; 650, Route Des Lucioles; F-06921 Sophia-Antipolis Cedex; France, No. Ljubljana; Jan. 8, 2009, 3 Pages, XP050318270, Jan. 8, 2009.

\* cited by examiner

POWER DECISION PILOT FOR WIRELESS COMMUNICATION

The present application is a Continuation of U.S. Utility application Ser. No. 12/690,677, entitled "Power Decision Pilot for Wireless Communication", filed Jan. 20, 2010, which claims benefit of U.S. Provisional Patent Application Ser. No. 61/147,407, entitled "Power Decision Pilot Indicator Channel," filed Jan. 26, 2009, U.S. Provisional Patent Application Ser. No. 61/147,408, entitled "Power Decision Pilot Indicator Channel," filed Jan. 26, 2009, U.S. Provisional Patent Application Ser. No. 61/147,851, entitled "Power Decision Pilot Indicator Channel—OFDMA," filed Jan. 28, 2009, and U.S. Provisional Patent Application Ser. No. 61/148,110, entitled "Power Decision Pilot Indicator Channel—SCFDMA," filed Jan. 29, 2009, all assigned to the assignee hereof and incorporated herein by reference by their entireties.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Techniques for transmitting power decision pilots to support communication in the presence of interference are described herein. A transmitter (e.g., a base station or a UE) may transmit a power decision pilot to indicate a transmit power level that it will use on subsequent time-frequency resources. A receiver (e.g., a UE or a base station) may receive power decision pilots from a set of transmitters and may estimate channel quality that the receiver can expect on the subsequent time-frequency resources based on the power decision pilots. The estimated channel quality may be used to select a data rate for data transmission to the receiver.

In one design, a station (e.g., a base station or a UE) may determine a set of time-frequency resources to use for transmitting a power decision pilot. This set of time-frequency resources may comprise a set of resource elements for at least one OFDMA symbol, or a set of resource units for at least one SC-FDMA symbol, or some other type of resources. The station may determine a transmit power level for the power decision pilot based on a transmit power level to use for data transmission. The station may transmit the power decision pilot on the set of time-frequency resources in a first time period to indicate the transmit power level to use for data transmission in a second time period after the first time period. The station may transmit the power decision pilot at zero power if data transmission will not be sent in the second time period.

The station may transmit one or more additional power decision pilots on one or more additional sets of time-frequency resources. In one design, multiple power decision pilots may be transmitted on different subbands and may indicate the transmit power levels to use for data transmission on these subbands. In another design, multiple power decision pilots may be transmitted on the same subband and may indicate the transmit power levels to use for data transmission on different subbands. In yet another design, multiple power decision pilots may be transmitted in the first time period and may indicate transmit power levels to use for data transmission in different time periods after the first time period.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-ORDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
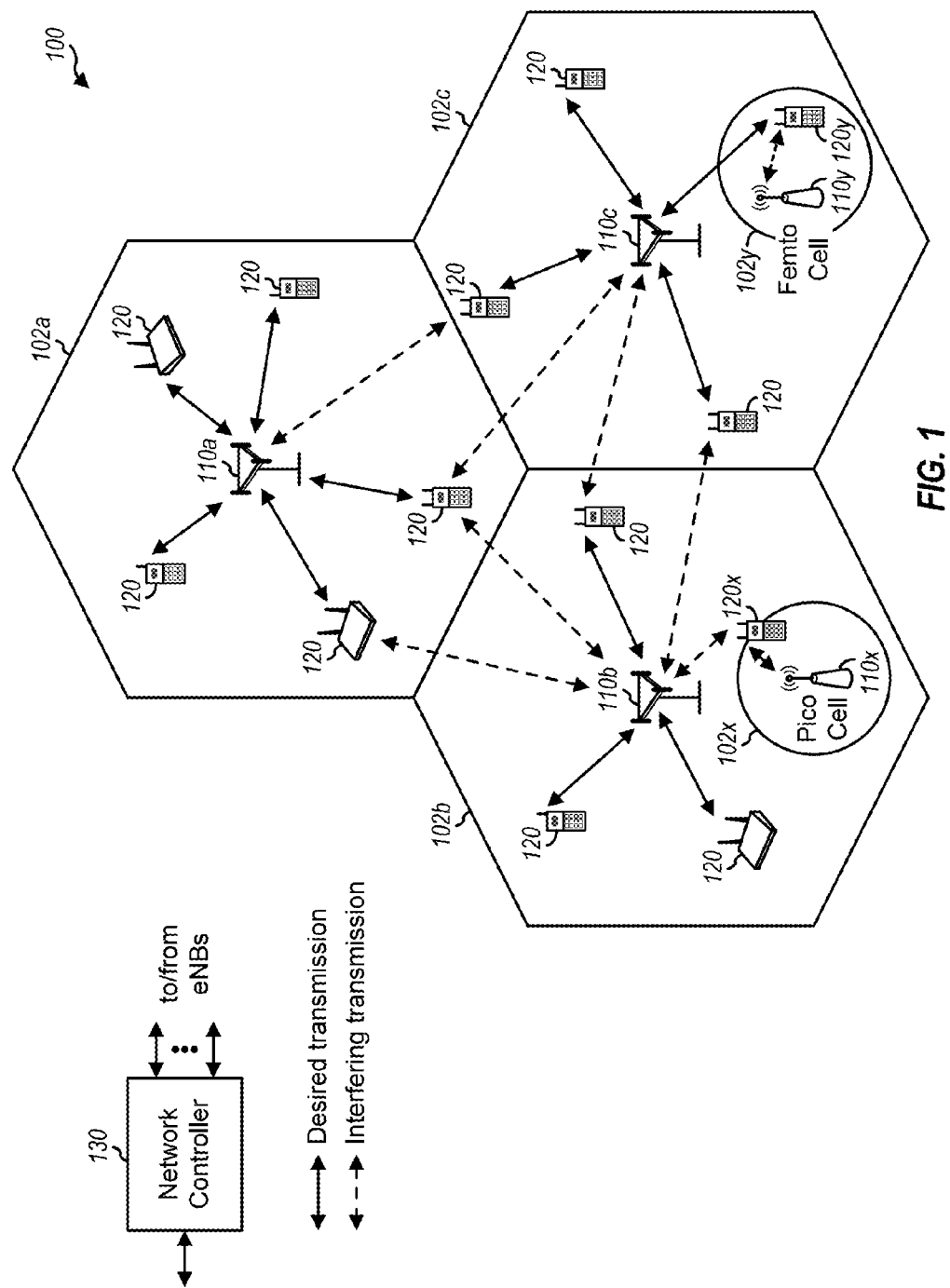
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs in a Closed Subscriber Group (CSG). In the example shown in FIG. 1, eNBs 110a, 110b and 110c may be macro eNBs for macro cells 102a, 102b and 102c, respectively. eNB 110x may be a pico eNB for a pico cell 102x. eNB 110y may be a femto eNB for a femto cell 102y. An eNB may support one or multiple (e.g., three) cells.

Wireless network 100 may be a homogeneous network that includes eNBs of the same type, e.g., only macro eNBs or only femto eNBs. Wireless network 100 may also be a heterogeneous network that includes eNBs of different types, e.g., macro eNBs, pico eNBs, femto eNBs, etc. These different types of eNBs may have different transmit power levels, different coverage areas, and different impact on interference in wireless network 100. For example, macro eNBs may have a high transmit power level (e.g., 20 Watts) whereas pico eNBs and femto eNBs may have a lower transmit power level (e.g., 1 Watt).

Wireless network 100 may be a synchronous network or an asynchronous network. For a synchronous network, the eNBs may have similar frame timing, and transmissions from different eNBs may be approximately aligned in time. For an asynchronous network, the eNBs may have different frame timing, and transmissions from different eNBs may not be aligned in time. The techniques described herein may be used for both synchronous and asynchronous networks.

A network controller 130 may couple to a set of eNBs and may provide coordination and control for these eNBs. Network controller 130 may communicate with eNBs 110 via a backhaul. eNBs 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and a neighbor eNB.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from and/or may cause high interference to one or more neighbor eNBs. A dominant interference scenario may occur due to restricted association. For example, in FIG. 1, UE 120y may be close to femto eNB 110y and may have high received power for eNB 110y. However, UE 120y may be unable to access femto eNB 110y due to restricted association and may then connect to macro eNB 110c with lower received power. UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, a power decision pilot (PDP) may be used to support communication in the presence of high interference. A power decision pilot may also be referred to as a power decision pilot channel (PDPICH), a power decision pilot indicator channel, a power decision reference signal, a resource quality indicator reference signal (RQI-RS), etc. Pilot is a transmission that is known a priori by a transmitter and a receiver and may also be referred to as a reference signal, training, etc. A power decision pilot is a pilot indicative of a transmit power level to be used on subsequent time-frequency resources. A transmitter may transmit a power decision pilot to indicate the transmit power level that it will use on subsequent time-frequency resources. A receiver may receive power decision pilots from a set of transmitters and may estimate the SNR (or the channel and interference conditions) that the receiver can expect on the subsequent time-frequency resources. The estimated SNR may be used to select a data rate for data transmission to the receiver on the subsequent time-frequency resources.

Figure 2:
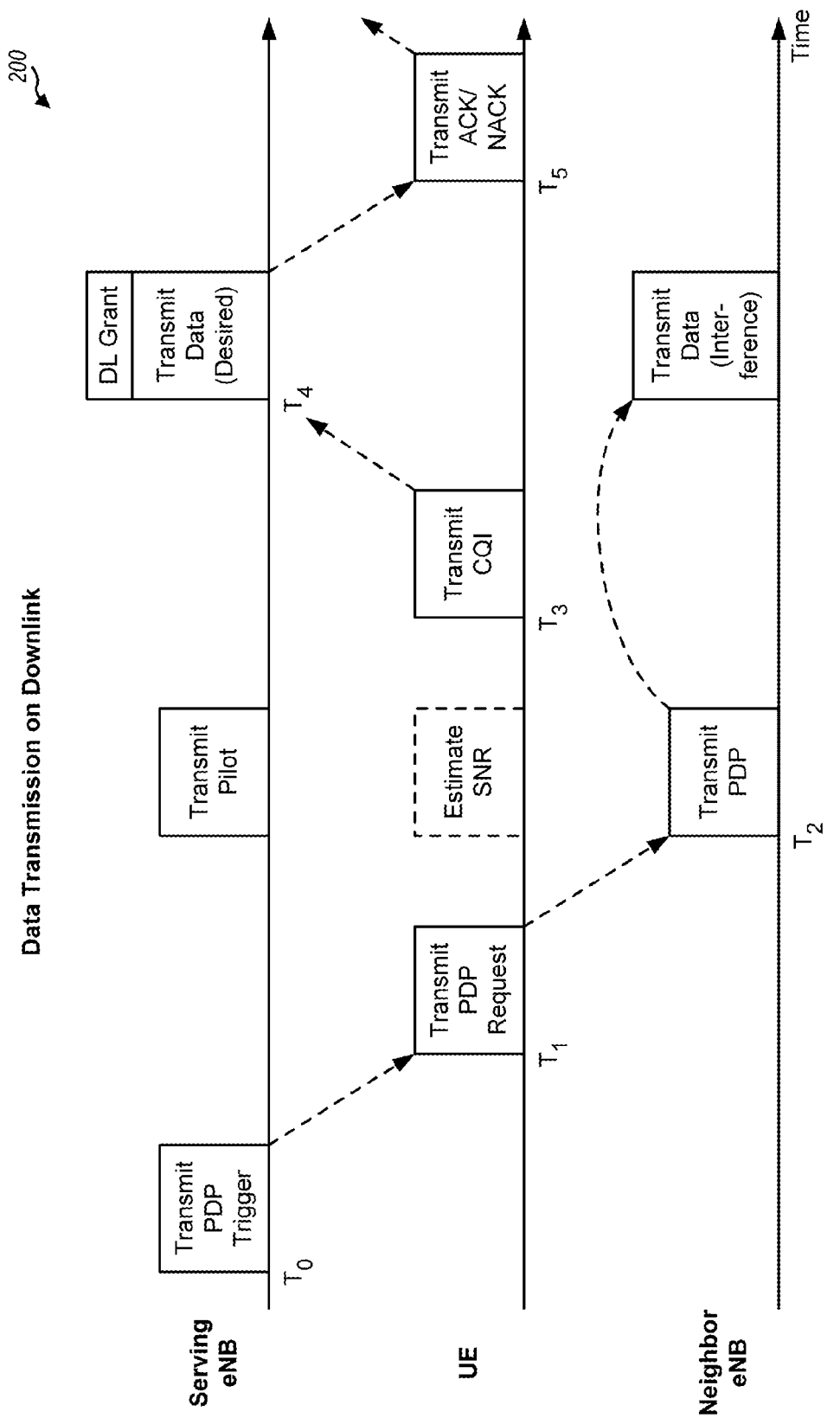
FIG. 2 shows an exemplary data transmission scheme for the downlink.

FIG. 2 shows a design of a downlink data transmission scheme 200 that uses power decision pilots. A serving eNB may have data to send to a UE and may have knowledge that the UE is observing high interference on the downlink. For example, the serving eNB may receive pilot measurement reports from the UE, and the reports may indicate and/or identify strong neighbor eNBs for the UE. The serving eNB may send a PDP trigger to the UE at time $T_0$. The UE may receive the PDP trigger and, in response, may send a PDP request at time $T_1$ to ask the neighbor eNBs to transmit power decision pilots. The PDP trigger and/or the PDP request may convey the priority of the trigger or request, a target interference level for the UE, and/or other information.

A neighbor eNB may receive the PDP request from the UE. The neighbor eNB may determine a transmit power level $P_{DATA}$ that it will use on subsequent time-frequency resources based on various factors such as its buffer status, the priority of the PDP request, a target interference level, etc. The neighbor eNB may transmit a power decision pilot at a power level of $P_{PDP}$ at time $T_2$. $P_{PDP}$ may be equal to $P_{DATA}$ or may be a scaled version of $P_{DATA}$.

The serving eNB may periodically transmit a pilot (e.g., at a fixed transmit power level), which may be used by the UEs to estimate the channel conditions for the downlink from the serving eNB. Although not shown in FIG. 2 for simplicity, the serving eNB may also transmit a power decision pilot, which may be used by the UEs to estimate the channel conditions on the downlink from the serving eNB.

The UE may receive power decision pilots from all neighbor eNBs as well as the pilot from the serving eNB. The UE may estimate SNR based on the received pilots. The power decision pilots may allow the UE to more accurately estimate SNR. The UE may determine channel quality indicator (CQI), which may comprise one or more SNR estimates, one or more data rates, one or more modulation and coding schemes (MCSs), etc. The UE may send the CQI to the serving eNB at time $T_3$.

The serving eNB may receive the CQI from the UE and may schedule the UE for data transmission on assigned resources, which may include all or a subset of the resources covered by the power decision pilots from the neighbor eNBs. The serving eNB may then send a downlink (DL) grant and data transmission in accordance with the reported CQI to the UE at time $T_4$. The UE may receive and decode the data transmission from the serving eNB. The UE may send acknowledgement (ACK) if the data transmission is decoded correctly or negative acknowledgement (NACK) if the data transmission is decoded in error at time $T_5$.

In the design shown in FIG. 2, the serving eNB may transmit a PDP trigger to initiate transmission of power decision pilots by neighbor eNBs. In another design, the UE may transmit a PDP request to initiate transmission of power decision pilots by the neighbor eNBs. Power decision pilots may also be transmitted in other manners. For example, the eNBs may transmit power decision pilots periodically, without any trigger or request.

In one design, the serving eNB may transmit the PDP trigger, the pilot, and data in subframes of one interlace for the downlink. This interlace may include subframes that are spaced apart by Q subframes, where Q may be equal to 4, 6, 8 or some other value. The UE may transmit the PDP request, the CQI, and the ACK/NACK in subframes of one interlace for the uplink. This design may simplify transmission of data and feedback information. In another design, the various transmissions may be sent in predetermined or configurable subframes.

Figure 3:
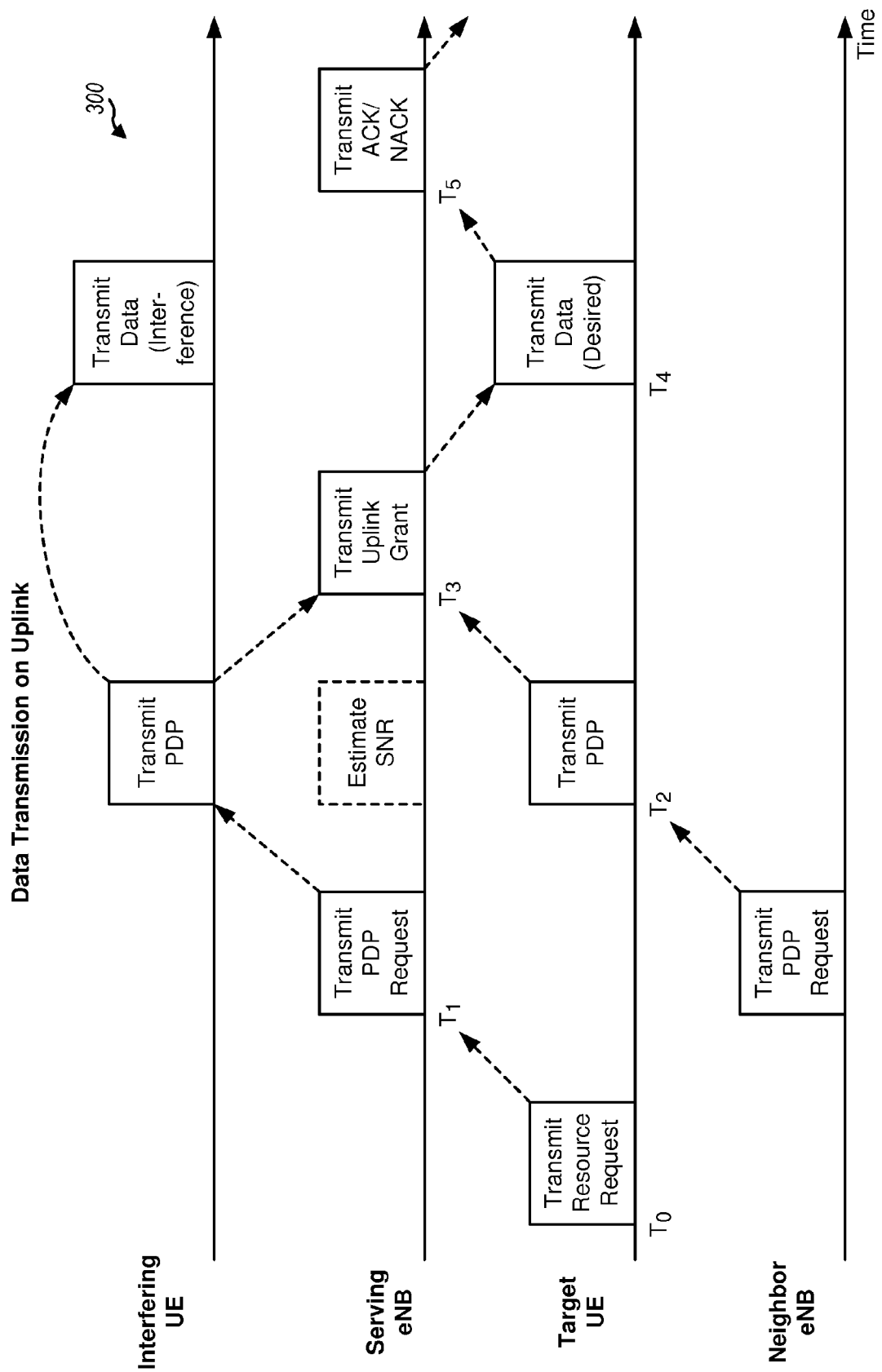
FIG. 3 shows an exemplary data transmission scheme for the uplink.

FIG. 3 shows a design of an uplink data transmission scheme 300 that uses power decision pilots. A UE may have data to send to a serving eNB and may transmit a resource request at time $T_0$. The serving eNB may observe high interference from other UEs, and may transmit a PDP request at time $T_1$ to ask the other UEs to transmit power decision pilots. The UE may also receive PDP requests from neighbor eNBs. Each UE may determine the transmit power level that it can use on subsequent time-frequency resources in response to one or more PDP requests received from one or more eNBs. Each UE may transmit a power decision pilot, at time $T_2$, which may indicate the transmit power level that the UE can use on the subsequent time-frequency resources.

The serving eNB may receive the power decision pilots from the UE as well as other UEs. The serving eNB may estimate SNR based on the received power decision pilots. The serving eNB may generate an uplink grant, which may include assigned resources, a selected MCS, a transmit power level to use on the assigned resources, etc. The serving eNB may send the uplink grant to the UE at time $T_3$. The UE may receive the uplink grant and may send data transmission in accordance with the uplink grant at time $T_4$. The serving eNB may receive and decode the data transmission from the UE and may send ACK or NACK based on the decoding result at time $T_5$.

In one design, the serving eNB may transmit the PDP request, the uplink grant, and ACK/NACK in subframes of one interlace for the downlink. The UE may transmit the resource request, the power decision pilot, and data in subframes of one interlace for the uplink. This design may simplify transmission of data and feedback information. In another design, the various transmissions may be sent in predetermined or configurable subframes.

As shown in FIG. 2, power decision pilots may be transmitted by eNBs to support data transmission on the downlink. As shown in FIG. 3, power decision pilots may be transmitted by UEs to support data transmission on the uplink. In one design, a power decision pilot may be transmitted in response to a PDP request. In another design, a power decision pilot may be transmitted in accordance with a configuration, which may specify when, where, and how many times to transmit the power decision pilot. A power decision pilot may be transmitted in various manners, as described below.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

Figure 4:
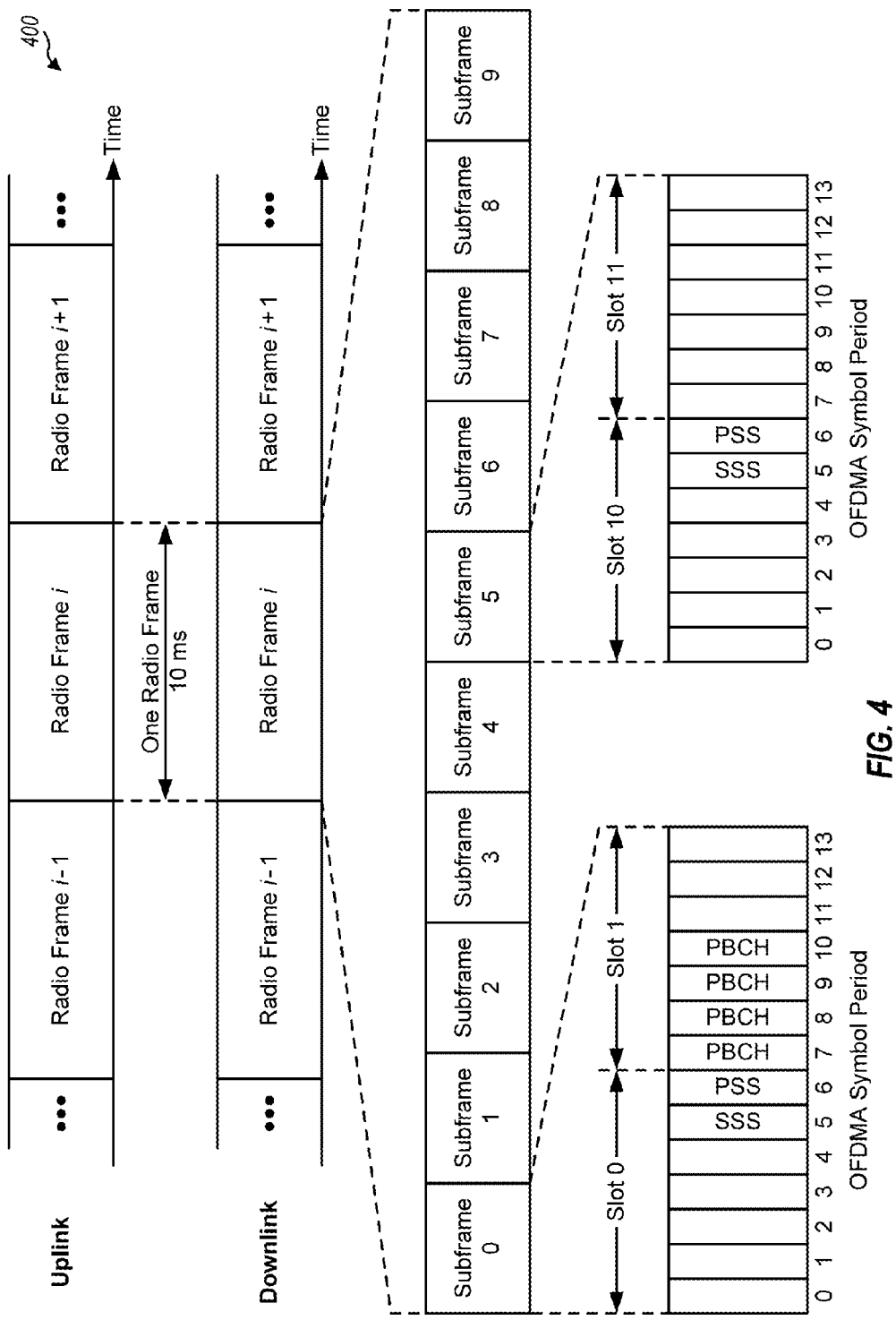
FIG. 4 shows an exemplary frame structure.

FIG. 4 shows a frame structure 400 used for frequency division duplexing (FDD) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 4) or six symbol periods for an extended cyclic prefix. The 2L symbol periods in each subframe may be assigned indices of 0 through 2L−1. On the downlink, an OFDMA symbol may be sent in each symbol period of a subframe. On the uplink, an SC-FDMA symbol may be sent in each symbol period of a subframe.

On the downlink in LTE, an eNB may transmit a primary synchronization signal (PSS) and a secondary synchronization signal (SSS) in the center 1.08 MHz of the system bandwidth for each cell served by the eNB. The PSS and SSS may be transmitted in symbol periods 6 and 5, respectively, in subframes 0 and 5 of each radio frame with the normal cyclic prefix, as shown in FIG. 4. The PSS and SSS may be used by the UEs for cell acquisition. The eNB may transmit a Physical Broadcast Channel (PBCH) in symbol periods 0 to 3 in slot 1 of subframe 0 in certain radio frames. The PBCH may carry some system information.

An eNB may transmit one or more power decision pilots on the downlink with OFDMA. Some time-frequency resources may be selected for transmitting the power decision pilot(s) and may be distributed across time and frequency. OFDMA symbols may be generated with the power decision pilot(s) transmitted on the selected time-frequency resources.

Figure 5:
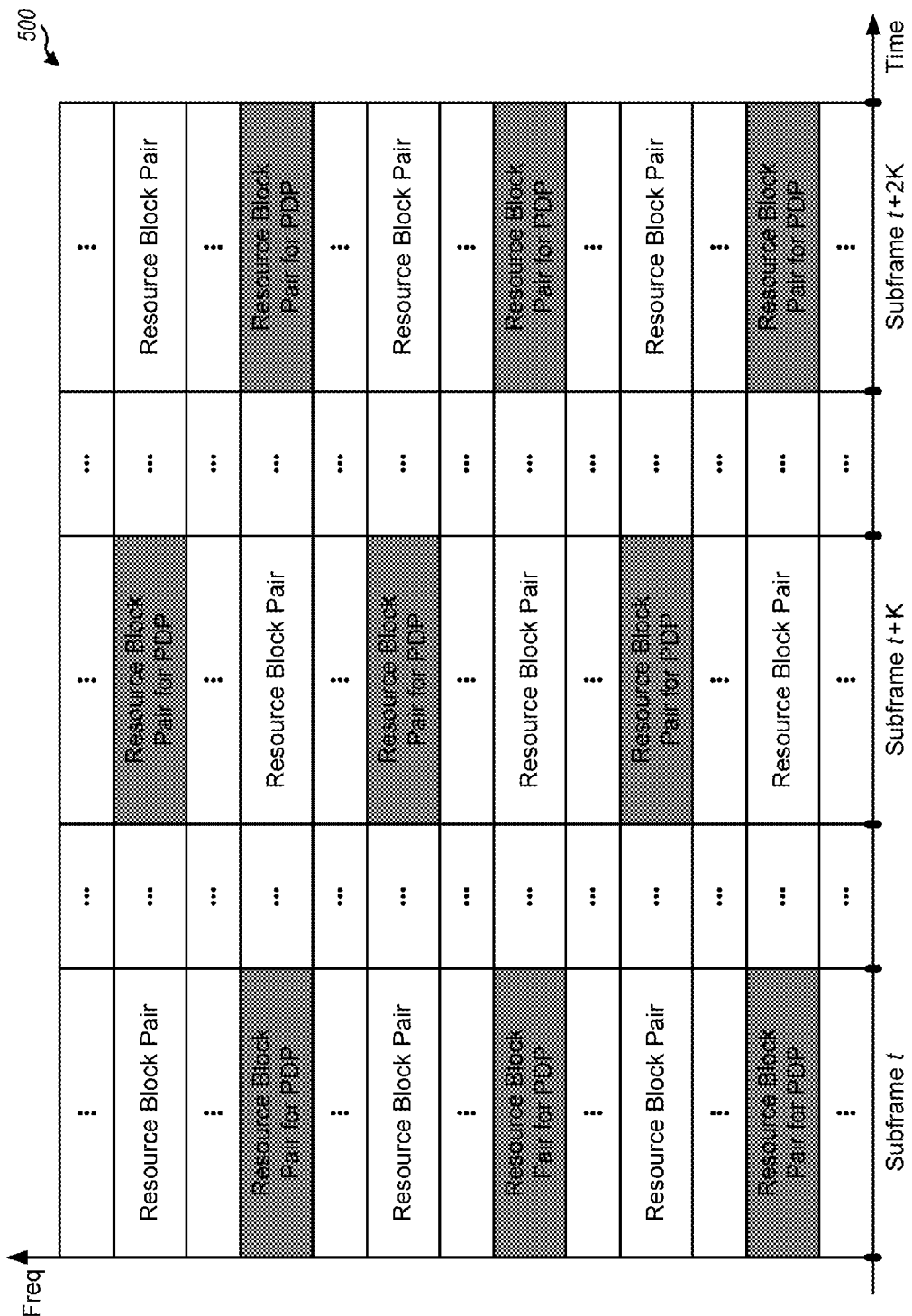
FIG. 5 shows transmission of a power decision pilot with OFDMA.

FIG. 5 shows a design of transmitting one or more power decision pilots on the downlink with OFDMA. The available time frequency resources for the downlink may be partitioned into resource blocks. A resource block may cover 12 subcarriers in one slot, and a pair of resource blocks may cover 12 subcarriers in one subframe. Each resource block may include a number of resource elements. Each resource element may cover one subcarrier in one OFDMA symbol period and may be used to send one modulation symbol, which may be a real or complex value.

In one design, certain resource blocks may be used to transmit one or more power decision pilots and may be referred to as selected resource blocks. The selected resource blocks may be located in subframes that are spaced apart by K subframes, where K may be one or greater. K may be selected based on time variation in a wireless channel. A smaller value of K may be used for high time variation, and a larger value of K may be used for low time variation.

The selected resource blocks may occupy multiple sets of subcarriers across frequency to capture frequency variation in the wireless channel. In one design, the selected resource blocks may occupy different sets of subcarriers in different subframes, e.g., as shown in FIG. 5. These different sets of subcarriers may be selected based on a staggering/hopping pattern. In another design, the selected resource blocks may occupy the same sets of subcarriers across subframes (not shown in FIG. 5).

In general, a sufficient number of resource elements may be used to transmit a power decision pilot to enable accurate SNR estimation while reducing overhead due to the power decision pilot. The selected resource elements may be distributed across time and frequency to capture time and frequency variations in the wireless channel. The selected resource elements may be located in certain symbol periods, or certain slots, or certain subframes, etc. The selected resource elements may be staggered across frequency (which may improve performance in a synchronous network) or may be fixed across frequency (which may be more desirable in an asynchronous network). The power decision pilot may be transmitted on a set of resource elements, which may be selected in various manners.

Figures 6A, 6B:
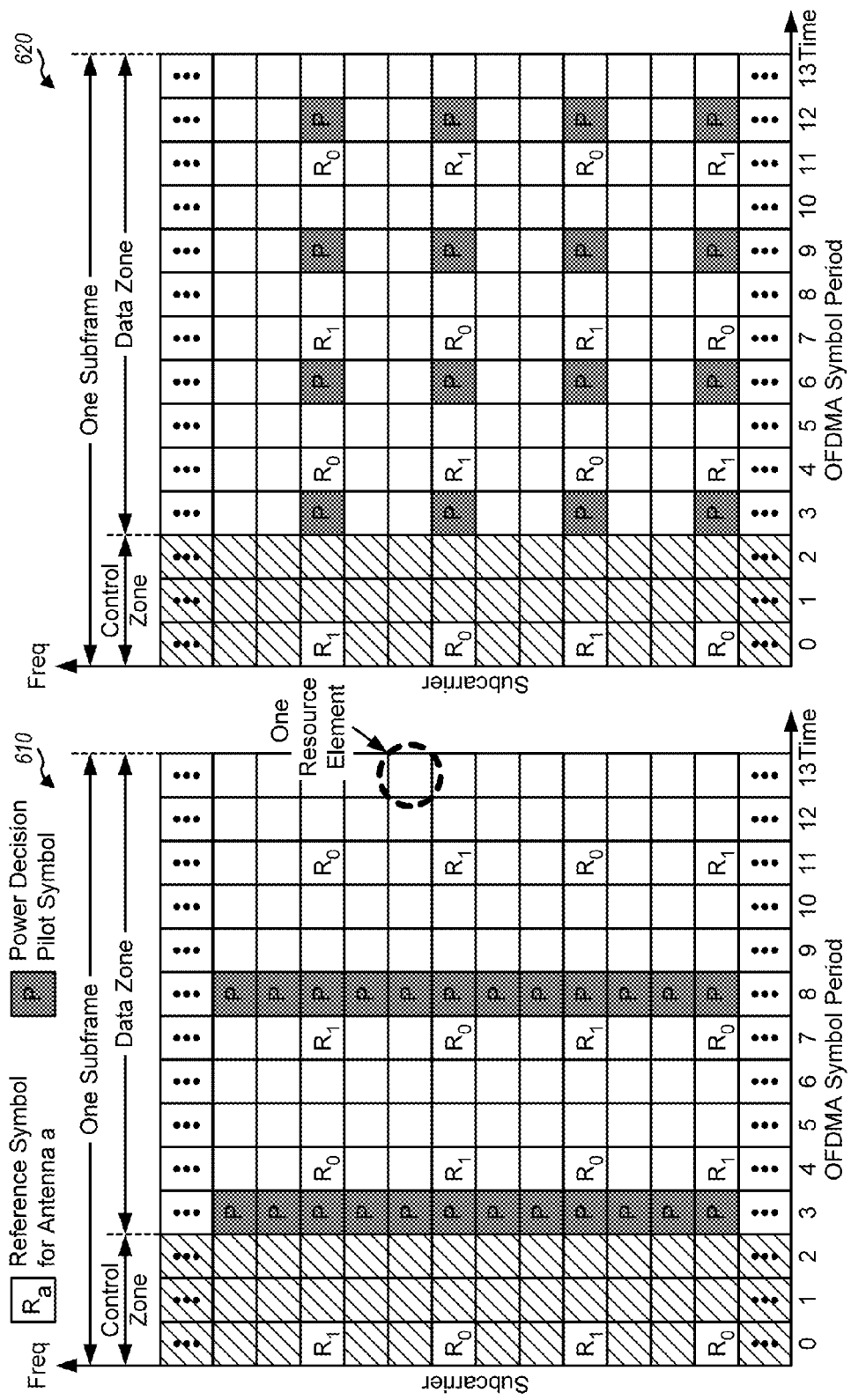
FIGS. 6A and 6B show two subframe formats for a power decision pilot.

FIG. 6A shows a design of a subframe format 610 for transmitting a power decision pilot on the downlink in a pair of resource blocks with OFDMA. As shown in FIG. 6A, a subframe may include a control zone followed by a data zone. The control zone may include the first M OFDMA symbol periods of the subframe, where M may be equal to 1, 2, 3 or 4 in general and M=3 in FIG. 6A. M may change from subframe to subframe. Control information may be transmitted in the first M OFDMA symbols. The data zone may include the remaining 2L−M OFDMA symbol periods of the subframe and may carry data for UEs.

Subframe format 610 in FIG. 6A may be used by an eNB equipped with two antennas. A cell-specific reference signal may be transmitted on some resource elements in symbol periods 0, 4, 7 and 11 and may be used by the UEs for channel estimation and other measurements. A power decision pilot may be transmitted on a set of resource elements, which may be selected from among the resource elements in the data zone that are not used for the cell-specific reference signal. In the design shown in FIG. 6A, the set of resource elements includes all resource elements in the resource block pair in symbol periods 3 and 8. This design can capture high frequency variation and low time variation.

FIG. 6B shows a design of a subframe format 620 for transmitting a power decision pilot on the downlink in a pair of resource blocks with OFDMA. In the design shown in FIG. 6B, the set of resource elements used for the power decision pilot includes every third resource elements in the resource block pair in symbol periods 3, 6, 9 and 12. This design can capture moderate frequency variation and moderate time variation.

FIGS. 6A and 6B show two exemplary designs for transmitting a power decision pilot on a pair of resource blocks in a subframe. The resource elements used for transmitting the power decision pilot may also be selected based on other patterns. In general, more resource elements may be selected across frequency to capture frequency variation, and more resource elements may be selected across time to capture time variation. The number of resource elements to use for the power decision pilot may be selected based on a tradeoff between SNR accuracy and pilot overhead. The specific resource elements to use for the power decision pilot may be selected from among the resource elements available for transmitting data, which may reduce impact due to the power decision pilot. The resource elements to use for the power decision pilot may avoid the control zone, the cell-specific reference signal, the PSS and SSS, and other control channels and reference signals.

A power decision pilot may be transmitted on a set of resource elements in various manners. In one design, a sequence of modulation symbols may be generated based on a pseudo-random sequence. In another design, a sequence of modulation symbols may be generated based on a CAZAC (constant amplitude zero auto correlation) sequence having a flat spectral response and zero auto-correlation. Some exemplary CAZAC sequences include a Zadoff-Chu sequence, a Chu sequence, a Frank sequence, a generalized chirp-like (GCL) sequence, etc. For both designs, the modulation symbols in the sequence may be mapped to the resource elements used to transmit the power decision pilot. OFDMA symbols may be generated with (i) the modulation symbols for the power decision pilot mapped to the resource elements used to transmit the power decision pilot and (ii) other modulation symbols and/or zero symbols with zero signal value mapped to other resource elements. In one design, the sequence of modulation symbols may uniquely identify a transmitter of the power decision pilot and/or may convey other information. A receiver may know the identity of the transmitter and may be able to generate the sequence of modulation symbols in the same manner as the transmitter.

In one design, different eNBs may transmit their power decision pilots on the same time-frequency resources, e.g., the same set of resource elements. The power decision pilots from different eNBs would then overlap one another, which may simplify SNR estimation by the UEs. Furthermore, an eNB may skip transmitting its power decision pilot on the time-frequency resources if the eNB will not transmit data on subsequent time-frequency resources. The UEs can receive all power decision pilots on the same time-frequency resources and can measure the power decision pilots from all eNBs that will transmit on the subsequent time-frequency resources. In another design, different eNBs may transmit their power decision pilots on different time-frequency resources. This design may be especially applicable for an asynchronous network and/or may be used for other reasons.

In one design, a transmit power level for a power decision pilot may be set equal to a transmit power level for data transmission on subsequent time-frequency resources, so that $P_{PDP}=P_{DATA}$. This design may simplify SNR estimation by the UEs. This design may also allow an eNB to skip transmitting the power decision pilot (or equivalently, to transmit the power decision pilot at zero transmit power) to indicate that the eNB will not transmit on subsequent time-frequency resources. In another design, the transmit power level for the power decision pilot may be set equal to a scaled version of the transmit power level for data transmission, so that $P_{PDP}=\alpha \times P_{DATA}$, where $\alpha$ is a scaling factor that may be known by both the eNB and the UEs. In yet another design, the power decision pilot may be transmitted at a fixed power level, and the transmit power level for data transmission may be conveyed by information sent in the power decision pilot.

In one design, an eNB may transmit a single power decision pilot to indicate a transmit power level that the eNB will use for data transmission across the entire system bandwidth in a future subframe. The eNB may transmit this power decision pilot across frequency, e.g., as shown in FIG. 5.

Figure 7A:
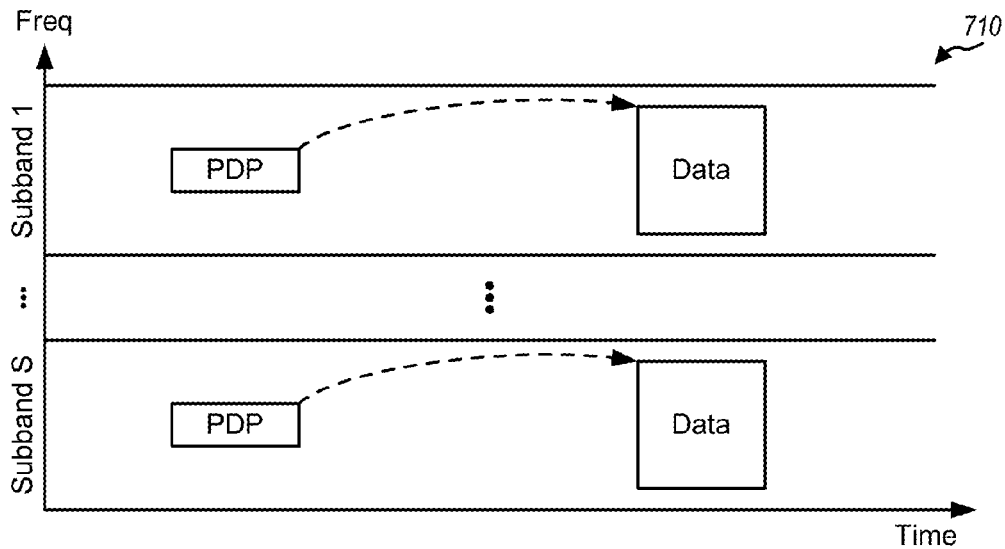
FIGS. 7A, 7B and 7C show transmission of multiple power decision pilots.

FIG. 7A shows a design of transmitting multiple power decision pilots for different subbands. The system bandwidth may be partitioned into S subbands that may be assigned indices of 1 through S, where S may be one or greater. Each subband may cover 1.08 MHz or some other range of frequencies. In one design, an eNB may transmit a power decision pilot on each of the S subbands. In this design, the power decision pilot transmitted on subband s may indicate the transmit power level that the eNB will use for data transmission on subband s in a future subframe, where $s \in \{1, \ldots, S\}$. In another design, the eNB may transmit power decision pilots on only a subset of the S subbands. In this design, the power decision pilot on a given subband may indicate the transmit power level that the eNB will use for data transmission on that subband as well as one or more other subbands.

Figure 7B:
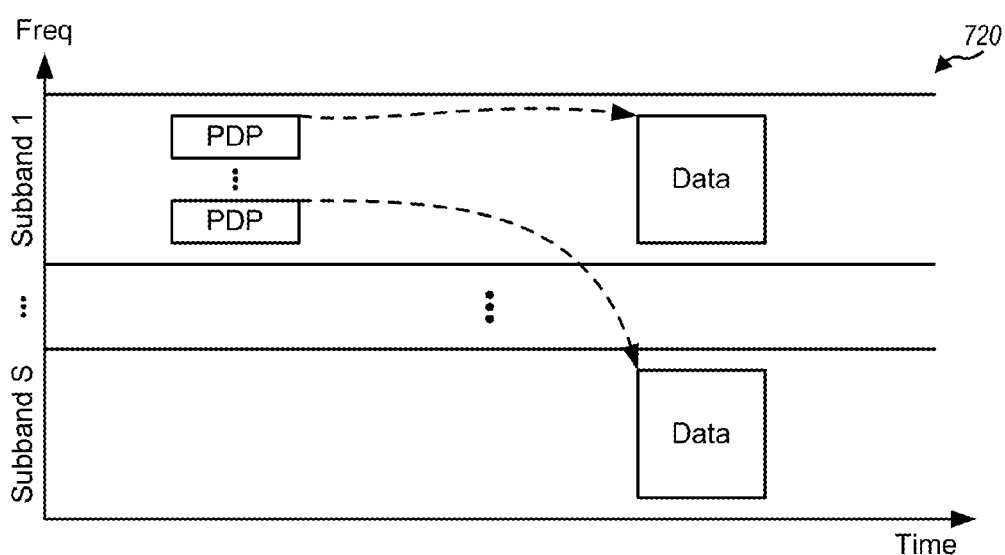

FIG. 7B shows another design of transmitting multiple power decision pilots for different subbands. In this design, an eNB may transmit the power decision pilots for all subbands on a designated subband, which may be subband 1 (as shown in FIG. 7B) or some other subband. Each power decision pilot may indicate the transmit power level that the eNB will use for data transmission on one or more subbands associated with that power decision pilot.

Figure 7C:
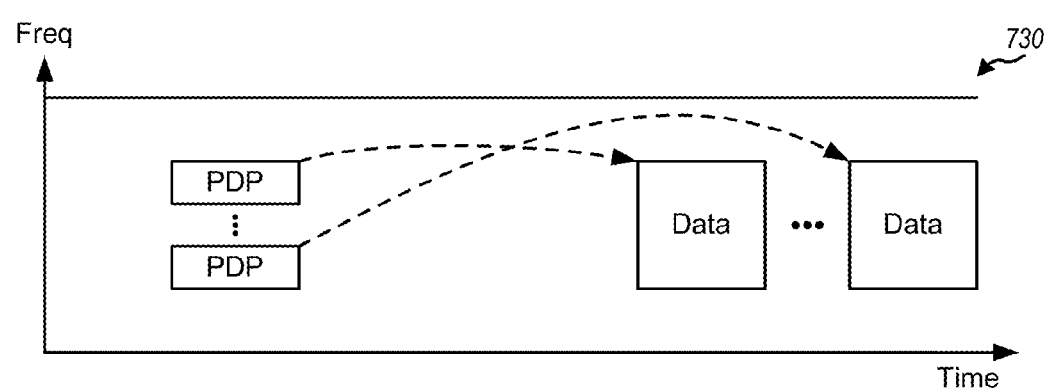

FIG. 7C shows a design of transmitting multiple power decision pilots for different subframes. In this design, an eNB may transmit multiple power decision pilots to indicate the transmit power levels that it will use for data transmission in different subframes. For example, the eNB may transmit multiple power decision pilots in subframe t. One power decision pilot may indicate the transmit power level that the eNB will use for data transmission in subframe t+Q, another power decision pilot may indicate the transmit power level that the eNB will use for data transmission in subframe t+Q+1, etc., where Q may be one or greater.

The designs in FIGS. 7A and 7B may allow an eNB to convey the transmit power levels that it will use for data transmission in the future with finer resolution across frequency. The design in FIG. 7C may allow the eNB to convey the transmit power levels that it will use for data transmission in the future with finer resolution across time.

In general, an eNB may transmit multiple power decision pilots to indicate transmit power levels that the eNB will use for data transmission on different sets of subsequent time-frequency resources, which may be in different subbands and/or different subframes. The eNB may transmit these power decision pilots in various manners, e.g., as shown in FIG. 7A, 7B or 7C. In one design, the eNB may transmit the multiple power decision pilots on different sets of resource elements in the same resource block(s). This design may reduce the number of resource blocks used for the power decision pilots, which may then reduce the number of resource blocks not available for data transmission. In another design, the eNB may transmit the multiple power decision pilots on different sets of resource elements in different resource blocks. In yet another design, the eNB may transmit multiple power decision pilots on the same set of resource elements, and the power decision pilots may be distinguished with different scrambling codes.

A UE may transmit one or more power decision pilots on the uplink with SC-FDMA. Some time-frequency resources may be selected for transmitting the power decision pilot(s). SC-FDMA symbols may be generated with the power decision pilot(s) transmitted on the selected time-frequency resources.

As noted above, modulation symbols are transmitted in the time domain with SC-FDMA. In a given SC-FDMA symbol period, N modulation symbols may be sent on N subcarriers by (i) performing an N-point discrete Fourier transform (DFT) on the N modulation symbols to obtain N frequency-domain symbols, where N may be an integer multiple of 12 for LTE, (ii) mapping the N frequency-domain symbols to the N subcarriers used for transmission, (iii) mapping zero symbols to the remaining subcarriers, (iv) performing an $N_{FFT}$-point inverse fast Fourier transform (IFFT) on $N_{FFT}$ mapped symbols for the $N_{FFT}$ subcarriers to obtain $N_{FFT}$ time-domain samples, and (v) appending a cyclic prefix to the $N_{FFT}$ samples to obtain an SC-FDMA symbol. It may be desirable to transmit the modulation symbols on N consecutive subcarriers in order to obtain a lower peak-to-average-power ratio (PAPR) for an SC-FDMA waveform.

Figure 8:
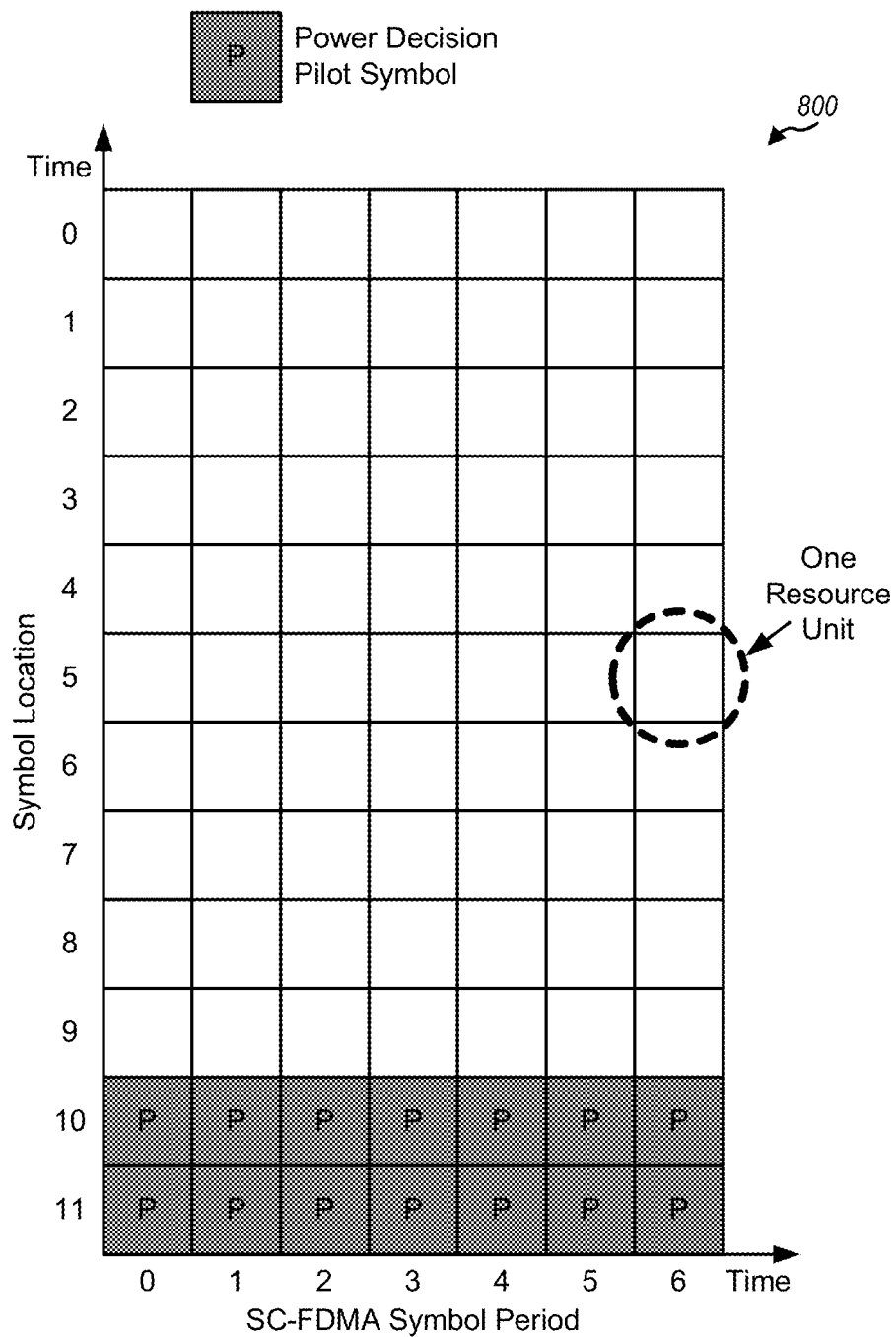
FIG. 8 shows transmission of a power decision pilot with SC-FDMA.

FIG. 8 shows a design of transmitting a power decision pilot on the uplink in one resource block with SC-FDMA. A 2-dimensional block 800 may be used to denote the time-frequency resources available for one resource block with SC-FDMA. The horizontal axis may represent time and may be partitioned into units of SC-FDMA symbol periods. The vertical axis may also represent time and may be partitioned into units of symbol locations. Twelve symbol locations may be available for one resource block and may be assigned indices of 0 through 11. Block 800 may include a number of resource units. Each resource unit may cover one symbol location in one SC-FDMA symbol period and may be used to send one modulation symbol.

A power decision pilot may be transmitted on a set of resource units in one or more resource blocks. In the design shown in FIG. 8, the power decision pilot is transmitted in each SC-FDMA symbol period. In another design, the power decision pilot may be transmitted in only some SC-FDMA symbol periods in a slot.

In one design, a power decision pilot may be transmitted in a predetermined fraction or percentage of the resource units available in each SC-FDMA symbol period in which the power decision pilot is transmitted. This predetermined fraction may be denoted as p and may be between 0 and 1, or $0 < p \leq 1$. In the example shown in FIG. 8, $p=\frac{1}{6}$ and the power decision pilot may be transmitted in two out of 12 resource units in each SC-FDMA symbol period.

In one design, a power decision pilot may be transmitted in the same symbol locations across SC-FDMA symbol periods, e.g., in symbol locations 10 and 11 in each SC-FDMA symbol period for the example shown in FIG. 8. In another design, a power decision pilot may be transmitted in different symbol locations across SC-FDMA symbol periods. In this design, the symbol locations for the power decision pilot may be selected based on a staggering/hopping pattern.

In general, a power decision pilot may be transmitted in a sufficient number of resource units to enable accurate SNR estimation while reducing pilot overhead. The power decision pilot may be transmitted in SC-FDMA symbol periods that may be spaced across time to capture time variation in the wireless channel. The power decision pilot may be transmitted in contiguous symbol locations to reduce aliasing effects, which may smear modulation symbols across symbol locations.

In one design, different UEs may transmit their power decision pilots to overlap one another. This may be achieved by having each UE transmit its power decision pilot with the same predetermined fraction p as well as in the same part of the available symbol locations, as described below.

Figure 9:
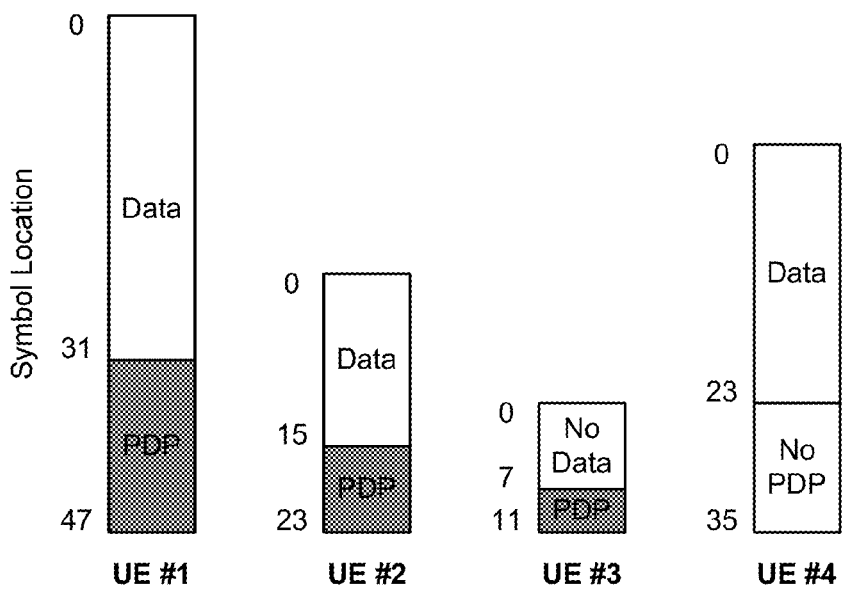
FIGS. 9 and 10 show exemplary transmission of power decision pilots by four UEs in one SC-FDMA symbol period.

FIG. 9 shows a design of transmitting power decision pilots on the uplink by four UEs in one SC-FDMA symbol period. In the example shown in FIG. 8, $p=\frac{1}{3}$ and each UE may transmit its power decision pilot in the last $\frac{1}{3}$ of the symbol locations available for that UE in the SC-FDMA symbol period. In the example shown in FIG. 9, UE #1 is allocated four resource blocks covering 48 symbol locations with indices of 0 through 47. UE #2 is allocated two resource blocks covering 24 symbol locations with indices of 0 through 23. UE #3 is allocated one resource block covering 12 symbol locations with indices of 0 through 11. UE #4 is allocated three resource blocks covering 36 symbol locations with indices of 0 through 35.

In the example shown in FIG. 8, UE #1 transmits data in symbol locations 0 through 31 and transmits a power decision pilot in symbol locations 32 through 47. UE #2 transmits data in symbol locations 0 through 15 and transmits a power decision pilot in symbol locations 16 through 23. UE #3 transmits nothing in symbol locations 0 through 7 and transmits a power decision pilot in symbol locations 8 through 11. UE #4 transmits data in symbol locations 0 through 23 and does not transmit a power decision pilot in symbol locations 24 through 35, e.g., because UE #4 will not transmit on subsequent time-frequency resources.

Figure 10:
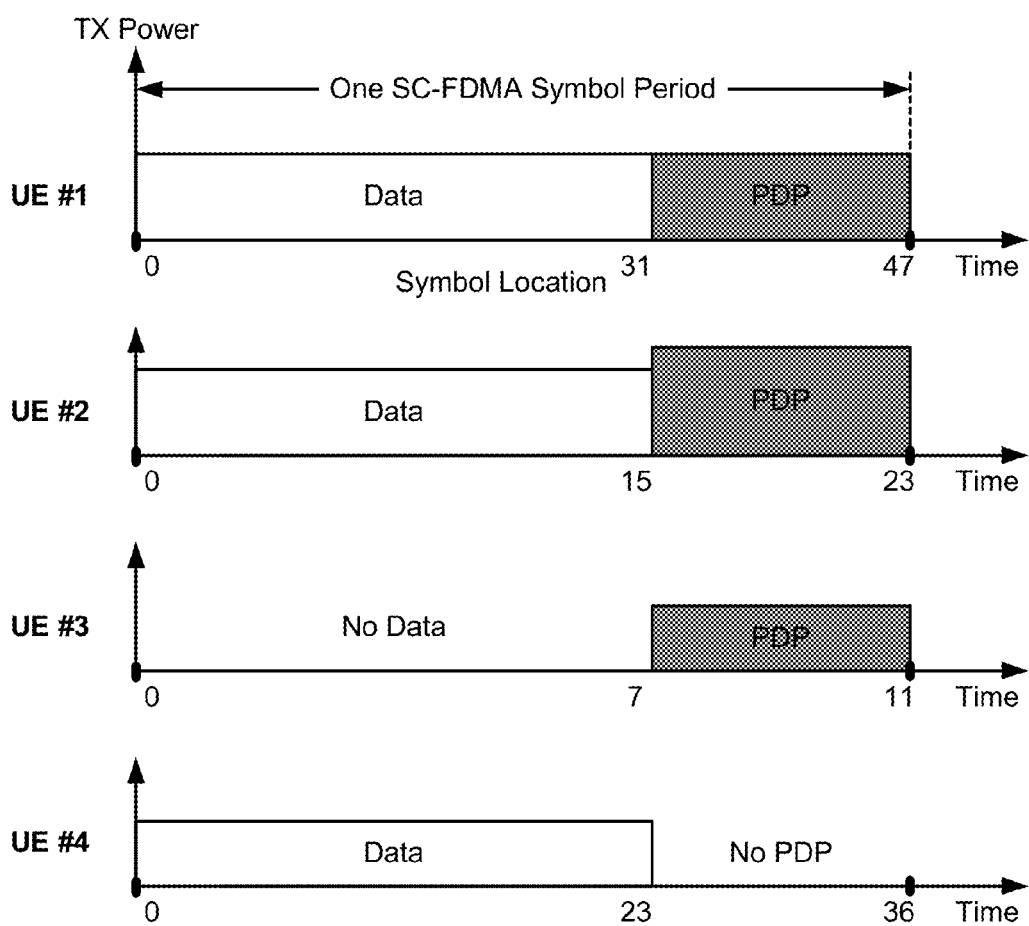

FIG. 10 shows plots of the transmissions from the four UEs in FIG. 9. In FIG. 10, the horizontal axis represents time and covers one SC-FDMA symbol period. The vertical axis represents transmit power. As shown in FIG. 10, both UE #1 and UE #2 transmit data in the first $\frac{2}{3}$ of the SC-FDMA symbol period and transmit their power decision pilots in the last $\frac{1}{3}$ of the SC-FDMA symbol period. UE #3 transmits its power decision pilot in the last $\frac{1}{3}$ of the SC-FDMA symbol period. UE #4 transmits data in the first $\frac{2}{3}$ of the SC-FDMA symbol period. As shown in FIG. 10, the power decision pilots from all UEs overlap in the last $\frac{1}{3}$ of the SC-FDMA symbol period due to transmission of the power decision pilot with the same predetermined fraction p as well as on the same part of the available symbol locations in the SC-FDMA symbol period.

FIGS. 9 and 10 show a design in which the UEs use the same fraction $p=\frac{1}{3}$ of the available symbol locations for the power decision pilots and further transmit their power decision pilots in contiguous symbol locations. This design may result in overlapping power decision pilots (e.g., as shown in FIG. 10), which may simplify SNR estimation. In general, the UEs may transmit their power decision pilots with the same or different fractions of the available symbol locations. Furthermore, the UEs may transmit their power decision pilots in contiguous or non-contiguous symbol locations.

In another design, a UE may transmit data and a power decision pilot with time division multiplexing (TDM). In this design, one or more SC-FDMA symbol periods may be used to transmit the power decision pilot, and the remaining SC-FDMA symbol periods may be used to transmit data and/or other information. The UE may transmit the power decision pilot on all available resource units in each SC-FDMA symbol period selected for transmitting the power decision pilot.

In yet another design, a UE may transmit data and a power decision pilot on different sets of subcarriers. For example, the UE may be assigned one or more resource blocks in a first subband for data transmission and may need to transmit the power decision pilot on one or more resource blocks in a second subband. The UE may frequency division multiplexed data with the power decision pilot. The UE may generate an SC-FDMA symbol comprising data on a first set of subcarriers in the first subband and the power decision pilot on a second set of subcarriers in the second subband. Since the first and second sets of subcarriers are not contiguous, the UE would not maintain a single-carrier waveform for the SC-FDMA symbol.

A UE may transmit multiple power decision pilots in a given SC-FDMA symbol period. These power decision pilots may indicate the transmit power levels that the UE will use for data transmission on different subbands and/or in different subframes. The UE may transmit the multiple power decision pilots in various manners.

In one design, the UE may time division multiplexed the multiple power decision pilots in different sets of symbol locations in the same SC-FDMA symbol period. For example, if $p=\frac{1}{3}$, then the UE may transmit a first power decision pilot in the first $\frac{1}{3}$ symbol locations, transmit a second power decision pilot in the next $\frac{1}{3}$ symbol locations, etc. This design may allow the UE to transmit multiple power decision pilots for different subbands and/or different subframes in a single subband, e.g., as shown in FIG. 7B. This design may allow the UE to maintain a single-carrier waveform.

In another design, the UE may time division multiplexed multiple power decision pilots in different SC-FDMA symbol periods. For example, the UE may transmit a first power decision pilot in a first SC-FDMA symbol period of a slot or subframe, transmit a second power decision pilot in a second SC-FDMA symbol period of the slot or subframe, etc. This design may allow the UE to transmit multiple power decision pilots for different subbands and/or different subframes in a single subband.

In yet another design, the UE may frequency division multiplexed the multiple power decision pilots on different sets of subcarriers, e.g., in different subbands. For example, the UE may transmit a first power decision pilot on a first set of subcarriers in a first subband, transmit a second power decision pilot on a second set of subcarriers in a second subband, etc., as shown in FIG. 7A. The UE may transmit the multiple power decision pilots on different sets of subcarriers using SC-FDMA or OFDMA.

A UE may transmit a power decision pilot on a set of resource units in one or more SC-FDMA symbols in various manners. In one design, a sequence of modulation symbols may be generated, e.g., based on a pseudo-random sequence or a CAZAC sequence. The sequence of modulation symbols may uniquely identify the UE and/or may convey other information. The modulation symbols in the sequence may be mapped to the resource units used to transmit the power decision pilot. One or more SC-FDMA symbols may be generated with (i) the modulation symbols for the power decision pilot mapped to the resource units used to transmit the power decision pilot and (ii) other modulation symbols and/or zero symbols mapped to remaining resource units.

In one design, a transmit power level for a power decision pilot may be set equal to a transmit power level for data transmission on subsequent time-frequency resources. In another design, the transmit power level for the power decision pilot may be set equal to a scaled version of the transmit power level for data transmission. In yet another design, the power decision pilot may be transmitted at a fixed power level, and the transmit power level for data transmission may be conveyed by information sent in the power decision pilot.

For both the downlink and uplink, a power decision pilot may be transmitted in various manner spatially. In one design, a power decision pilot may be transmitted without precoding. In another design, a power decision pilot may be transmitted in a particular spatial direction with precoding. In yet another design, multiple power decision pilots may be transmitted corresponding to multiple layers that may be used for data transmission. The power decision pilots for the multiple layers may or may not overlap.

Figure 11:
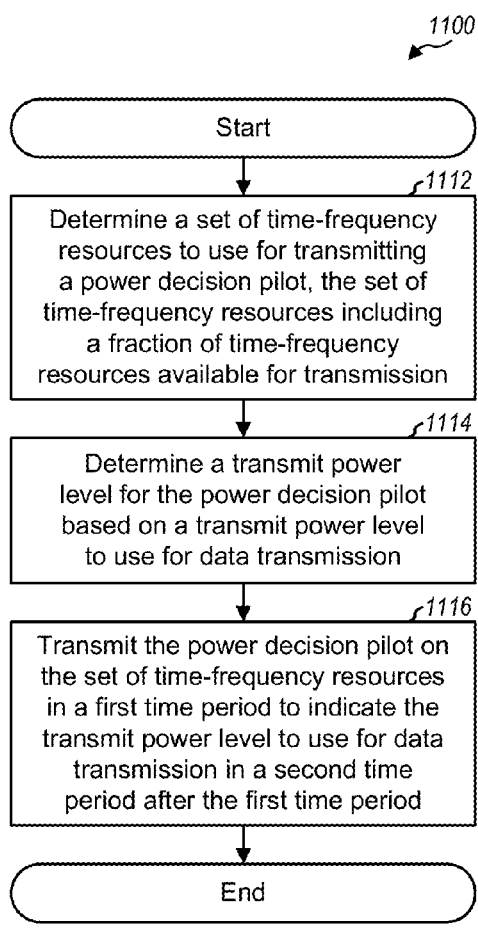
FIG. 11 shows a process for transmitting a power decision pilot.

FIG. 11 shows a design of a process 1100 for transmitting a power decision pilot. Process 1100 may be performed by a station, which may be a base station/eNB, or a UE, or some other entity. The station may determine a set of time-frequency resources to use for transmitting a power decision pilot (block 1112). This set of time-frequency resources may include a fraction of time-frequency resources available for transmission. In one design, the station may determine a transmit power level for the power decision pilot based on a transmit power level to use for data transmission (block 1114). The transmit power level for the power decision pilot may be equal to the transmit power level for data transmission, or related to the transmit power level for data transmission by a scaling factor, or equal to a fixed transmit power level.

The station may transmit the power decision pilot on the set of time-frequency resources in a first time period, at the transmit power level determined for the power decision pilot, to indicate the transmit power level to use for data transmission in a second time period after the first time period (block 1116). The station may transmit the power decision pilot at zero power if data transmission will not be sent in the second time period. In one design, the first and second time periods may correspond to consecutive subframes in an interlace that includes evenly spaced subframes. In another design, the second time period may be separated from the first time period by a variable amount, which may be conveyed by the power decision pilot or via some other mechanism.

In one design, the station may receive a request to transmit a power decision pilot and may transmit the power decision pilot in response to the request. In another design, the station may receive an indication to transmit the power decision pilot in accordance with a particular configuration. The station may then periodically transmit the power decision pilot in accordance with the configuration, e.g., in evenly spaced time periods.

In one design, the station may transmit the power decision pilot with OFDMA. In this design, the set of time-frequency resources may comprise a set of resource elements, which may include a fraction of resource elements available for transmission. The set of resource elements may be distributed across a plurality of subcarriers and/or a plurality of symbol periods in at least one resource block, e.g., as shown in FIG. 6A or 6B. The station may transmit the power decision pilot on the set of resource elements. The station may generate at least one OFDMA symbol comprising the power decision pilot on the set of resource elements and may transmit the at least one OFDMA symbol. The power decision pilot may be transmitted on the same subcarriers in different OFDMA symbols or on different subcarriers in different OFDMA symbols. The different subcarriers may be determined based on a staggering/hopping pattern.

In another design, the station may transmit the power decision pilot with SC-FDMA. In this design, the set of time-frequency resources may comprise a set of resource units in at least one SC-FDMA symbol. The set of resource units may include a predetermined fraction of all resource units available for transmission in each SC-FDMA symbol, e.g., as shown in FIG. 8. The set of resource units may also comprise predetermined ones of the available resource units, e.g., the last two resource units in each SC-FDMA symbol, as shown in FIG. 8. The station may generate at least one SC-FDMA symbol comprising the power decision pilot in the set of resource units and may transmit the at least one SC-FDMA symbol. The power decision pilot may be transmitted in the same symbol locations in different SC-FDMA symbols (e.g., as shown in FIG. 8) or in different symbol locations in different SC-FDMA symbols.

In one design, the station may generate a sequence of symbols identifying the station. The station may map the sequence of symbols to the set of time-frequency resources to use for transmitting the power decision pilot. A plurality of stations may transmit their power decision pilots on the same set of time-frequency resources. The power decision pilots from these stations would then overlap, which may simplify SNR estimation.

In one design, the station may transmit the power decision pilot on a subband among a plurality of subbands. The power decision pilot may indicate the transmit power level to use for data transmission on the same subband in the second time period.

In one design, the station may determine a second set of time-frequency resources to use for transmitting a second power decision pilot. The station may transmit the second power decision pilot on the second set of time-frequency resources in the first time period to indicate a second transmit power level to use for data transmission after the first time period. In one design, for OFDMA, the two sets of time-frequency resources for the two power decision pilots may comprise two sets of resource elements in at least one resource block. In another design, for SC-FDMA, the two sets of time-frequency resources may comprise two sets of resource units in the same SC-FDMA symbol or in different SC-FDMA symbols.

In one design, the two power decision pilots may be transmitted on first and second subbands and may indicate the transmit power levels to use for data transmission on the first and second subbands, respectively, e.g., as shown in FIG. 7A. In another design, the two power decision pilots may be transmitted on the same subband and may indicate the transmit power levels to use for data transmission on the first and second subbands, e.g., as shown in FIG. 7B. In yet another design, the two power decision pilots may be transmitted in the first time period and may indicate transmit power levels to use for data transmission in the second time period and a third time period. The station may also transmit one or more additional power decision pilots.

Figure 12:
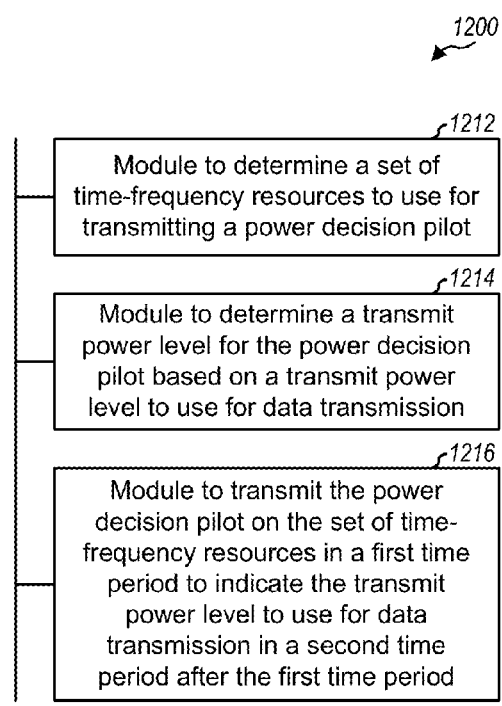
FIG. 12 shows an apparatus for transmitting a power decision pilot.

FIG. 12 shows a design of an apparatus 1200 for transmitting a power decision pilot. Apparatus 1200 includes a module 1212 to determine a set of time-frequency resources to use for transmitting a power decision pilot, a module 1214 to determine a transmit power level for the power decision pilot based on a transmit power level to use for data transmission, and a module 1216 to transmit the power decision pilot on the set of time-frequency resources in a first time period to indicate the transmit power level to use for data transmission in a second time period after the first time period.

Figures 13, 14:
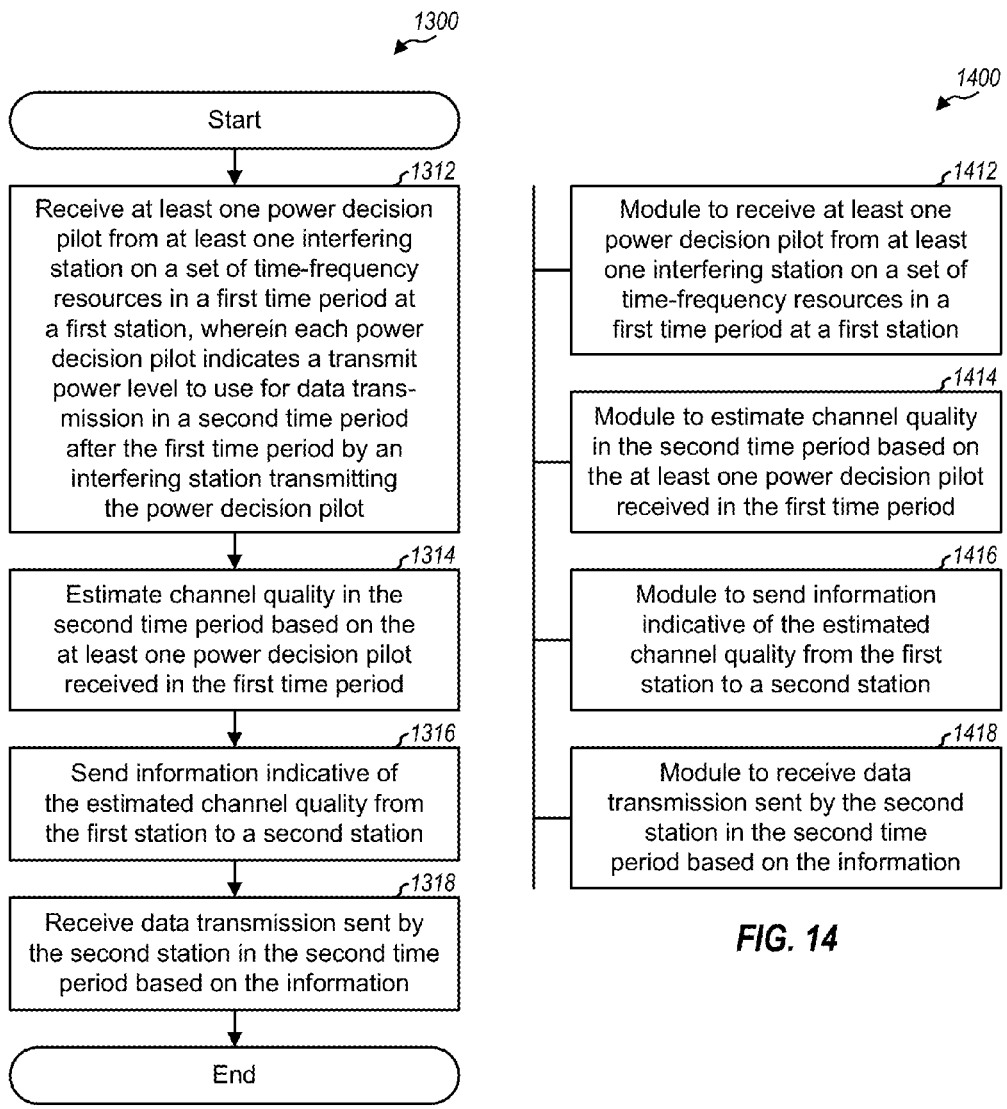
FIG. 13 shows a process for receiving power decision pilots.
FIG. 14 shows an apparatus for receiving power decision pilots.

FIG. 13 shows a design of a process 1300 for receiving power decision pilots. Process 1300 may be performed by a first station, which may be a base station/eNB, or a UE, or some other entity. The first station may receive at least one power decision pilot from at least one interfering station on a set of time-frequency resources in a first time period (block 1312). Each power decision pilot may indicate a transmit power level to use for data transmission in a second time period after the first time period by an interfering station transmitting the power decision pilot.

The first station may estimate channel quality in the second time period based on the at least one power decision pilot received in the first time period (block 1314). In one design, the first station may estimate interference due to each interfering station in the second time period based on the power decision pilot received from that interfering station. The first station may then estimate channel quality in the second time period based on the estimated interference from the at least one interfering station.

The first station may send information indicative of the estimated channel quality to a second station (block 1316). The first station may then receive data transmission sent by the second station in the second time period based on the information (block 1318). For data transmission on the downlink, the first station may be a UE, the second station may be a serving base station, and the at least one interfering station may be at least one interfering base station. For data transmission on the uplink, the first station may be a base station, the second station may be a target UE, and the at least one interfering station may be at least one interfering UE.

FIG. 14 shows a design of an apparatus 1400 for receiving power decision pilots. Apparatus 1400 includes a module 1412 to receive at least one power decision pilot from at least one interfering station on a set of time-frequency resources in a first time period at a first station, a module 1414 to estimate channel quality in the second time period based on the at least one power decision pilot received in the first time period, a module 1416 to send information indicative of the estimated channel quality from the first station to a second station, and a module 1418 to receive data transmission sent by the second station in the second time period based on the information.

The modules in FIGS. 12 and 14 may comprise processors, electronic devices, hardware devices, electronic components, logical circuits, memories, software codes, firmware codes, etc., or any combination thereof.

Figure 15:
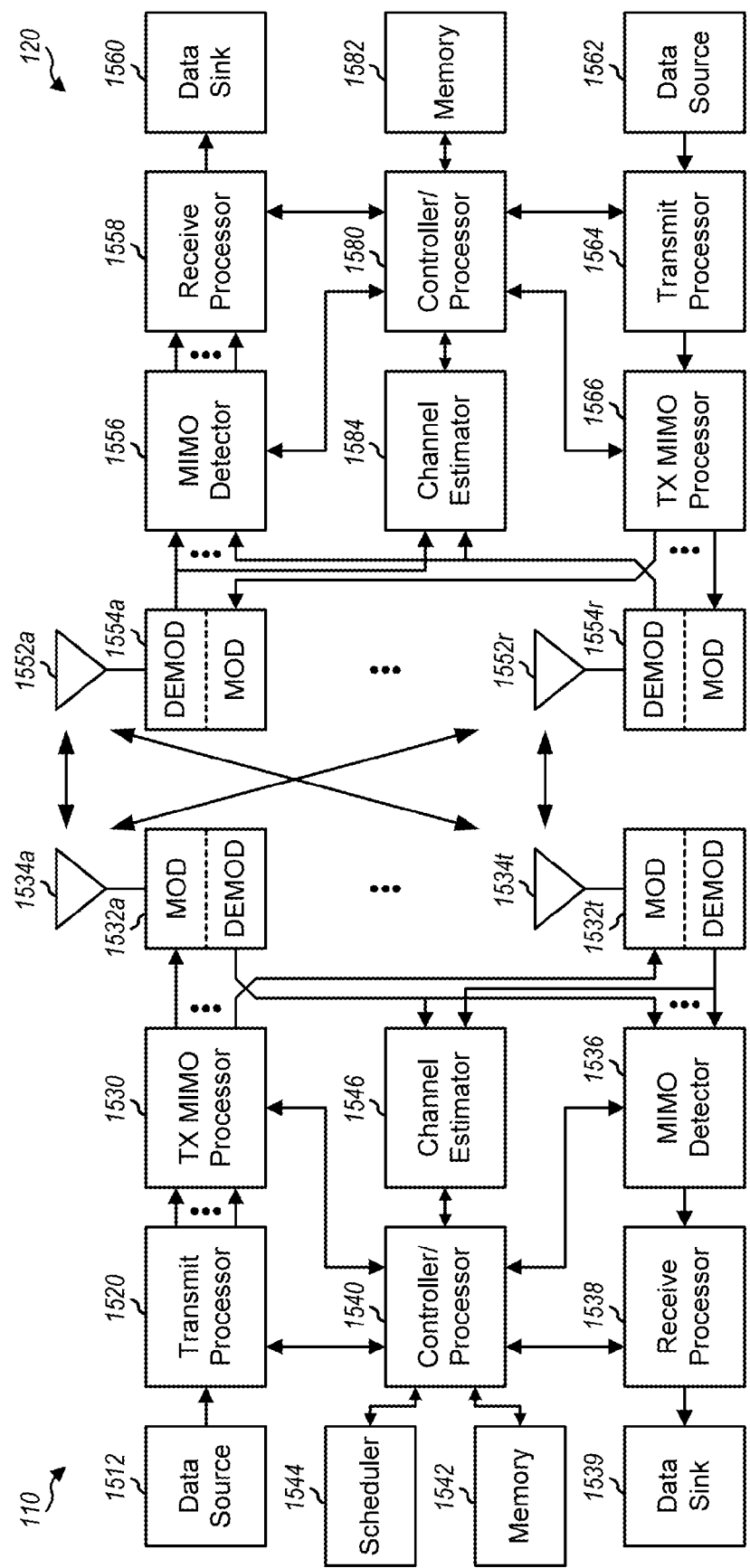
FIG. 15 shows a block diagram of a base station and a UE.

FIG. 15 shows a block diagram of a design of a base station/eNB 110 and a UE 120, which may be one of the base stations/eNBs and one of the UEs in FIG. 1. Base station 110 may be equipped with T antennas 1534a through 1534t, and UE 120 may be equipped with R antennas 1552a through 1552r, where in general $T \geq 1$ and $R \geq 1$.

At base station 110, a transmit processor 1520 may receive data from a data source 1512 and control information from a controller/processor 1540. Processor 1520 may process (e.g., encode, interleave, and symbol map) the data and control information to obtain data symbols and control symbols, respectively. Processor 1520 may also generate pilot symbols for one or more power decision pilots and reference signals. A transmit (TX) multiple-input multiple-output (MIMO) processor 1530 may perform spatial processing (e.g., precoding) on the data symbols, the control symbols, and/or the pilot symbols, if applicable, and may provide T output symbol streams to T modulators (MODs) 1532a through 1532t. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink signal. T downlink signals from modulators 1532a through 1532t may be transmitted via T antennas 1534a through 1534t, respectively.

At UE 120, antennas 1552a through 1552r may receive the downlink signals from base station 110 and may provide received signals to demodulators (DEMODs) 1554a through 1554r, respectively. Each demodulator 1554 may condition (e.g., filter, amplify, downconvert, and digitize) its received signal to obtain input samples. Each demodulator 1554 may further process the input samples (e.g., for OFDM, etc.) to obtain received symbols. A MIMO detector 1556 may obtain received symbols from all R demodulators 1554a through 1554r, perform MIMO detection on the received symbols if applicable, and provide detected symbols. A receive processor 1558 may process (e.g., demodulate, deinterleave, and decode) the detected symbols, provide decoded data for UE 120 to a data sink 1560, and provide decoded control information to a controller/processor 1580.

On the uplink, at UE 120, a transmit processor 1564 may receive and process data from a data source 1562 and control information from controller/processor 1580. Processor 1564 may also generate pilot symbols for one or more power decision pilots and reference signals. The symbols from transmit processor 1564 may be precoded by a TX MIMO processor 1566 if applicable, further processed by modulators 1554a through 1554r (e.g., for SC-FDM, etc.), and transmitted to base station 110. At base station 110, the uplink signals from UE 120 may be received by antennas 1534, processed by demodulators 1532, detected by a MIMO detector 1536 if applicable, and further processed by a receive processor 1538 to obtain decoded data and control information sent by UE 120. Processor 1538 may provide the decoded data to a data sink 1539 and the decoded control information to controller/processor 1540.

Controllers/processors 1540 and 1580 may direct the operation at base station 110 and UE 120, respectively. Channel processors 1546 and 1584 may process power decision pilots and other pilots received on the uplink and downlink, respectively, and may obtain channel quality estimates. Processor 1540 and/or other processors and modules at base station 110 may perform or direct process 1100 in FIG. 11, process 1300 in FIG. 13, and/or other processes for the techniques described herein. Processor 1580 and/or other processors and modules at UE 120 may also perform or direct process 1100, process 1300, and/or other processes for the techniques described herein. Memories 1542 and 1582 may store data and program codes for base station 110 and UE 120, respectively. A scheduler 1544 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication by a user equipment (UE), comprising:
   receiving, from a first base station, a request to transmit a first power decision pilot;
   determining a first set of time-frequency resources to use for transmitting the first power decision pilot, the first set of time-frequency resources including a fraction of time-frequency resources available for transmission;
   transmitting, based on receiving the request, the first power decision pilot on the first set of time-frequency resources in a first time period to indicate a first transmit power level to use for data transmission in a second time period after the first time period;
   receiving, from a second base station, an uplink grant based at least in part on the first power decision pilot and a second power decision pilot from another UE; and
   transmitting, to the second base station, data in accordance with the uplink grant.

2. The method of claim 1, wherein the another UE is an interfering UE.

3. The method of claim 1, further comprising:
determining a second transmit power level for the first power decision pilot based on the first transmit power level to use for data transmission in the second time period, and wherein the first power decision pilot is transmitted at the second transmit power level determined for the first power decision pilot.

4. The method of claim 1, wherein the first power decision pilot is transmitted at zero power if the data transmission is not sent in the second time period.

5. The method of claim 1, wherein the determining the first set of time-frequency resources comprises determining a first set of resource elements to use for transmitting the first power decision pilot, and wherein the transmitting the first power decision pilot comprises transmitting the first power decision pilot on the first set of resource elements.

6. The method of claim 5, wherein the first set of resource elements is distributed across a plurality of subcarriers and a plurality of symbol periods in at least one resource block.

7. The method of claim 5, further comprising:
generating at least one Orthogonal Frequency Division Multiple Access (OFDMA) symbol comprising the first power decision pilot on the first set of resource elements,
wherein the transmitting the first power decision pilot on the first set of resource elements comprises transmitting the at least one OFDMA symbol.

8. The method of claim 1, wherein the determining the first set of time-frequency resources comprises determining a first set of resource units to use for transmitting the first power decision pilot in at least one Single-Carrier Frequency Division Multiple Access (SC-FDMA) symbol, and wherein the transmitting the first power decision pilot comprises transmitting the first power decision pilot on the first set of resource units in the at least one SC-FDMA symbol.

9. The method of claim 8, wherein the first set of resource units occupies a predetermined fraction of symbol locations available for transmission in each SC-FDMA symbol.

10. The method of claim 8, wherein the first set of resource units comprises predetermined ones of resource units available for transmission in the at least one SC-FDMA symbol.

11. The method of claim 1, further comprising:
generating a sequence of symbols identifying the UE transmitting the first power decision pilot, and
mapping the sequence of symbols to the first set of time-frequency resources to use for transmitting the first power decision pilot.

12. The method of claim 1, wherein the first power decision pilot is transmitted on a subband, among a plurality of subbands, and indicates the first transmit power level to use for data transmission on the subband in the second time period.

13. The method of claim 1, further comprising:
determining a second set of time-frequency resources to use for transmitting a second power decision pilot; and
transmitting the second power decision pilot on the second set of time-frequency resources in the first time period to indicate a third transmit power level to use for data transmission after the first time period.

14. The method of claim 13, wherein the second power decision pilot indicates the third transmit power level to use for data transmission in a third time period after the second time period.

15. The method of claim 1, wherein the first power decision pilot is transmitted periodically in evenly spaced time periods.

16. The method of claim 1, wherein the first power decision pilot is transmitted on different subcarriers in different time periods based on a pattern.

17. The method of claim 1, wherein the first and second time periods correspond to consecutive subframes in an interlace including evenly spaced subframes.

18. An apparatus for wireless communications, comprising:
means for receiving, from a first base station, a request to transmit a first power decision pilot;
means for determining a first set of time-frequency resources to use for transmitting the first power decision pilot, the set of time-frequency resources including a fraction of time-frequency resources available for transmission;
means for transmitting based on receiving the request, the first power decision pilot on the first set of time-frequency resources in a first time period to indicate a first transmit power level to use for data transmission in a second time period after the first time period;
means for receiving, from a second base station, an uplink grant based at least in part on the first power decision pilot and a second power decision pilot from another apparatus; and
means for transmitting, to the second base station, data in accordance with the uplink grant.

19. The apparatus of claim 18, wherein the another apparatus is an interfering UE.

20. The apparatus of claim 18, further comprising:
means for determining a second transmit power level for the first power decision pilot based on the first transmit power level to use for data transmission in the second time period, wherein the first power decision pilot is transmitted at the second transmit power level determined for the first power decision pilot.

21. The apparatus of claim 18, wherein the means for determining the first set of time-frequency resources comprises means for determining a first set of resource elements to use for transmitting the first power decision pilot, and wherein the means for transmitting the first power decision pilot comprises means for transmitting the first power decision pilot on the first set of resource elements.

22. The apparatus of claim 18, further comprising:
means for generating a sequence of symbols identifying the apparatus transmitting the first power decision pilot, and
means for mapping the sequence of symbols to the first set of time-frequency resources to use for transmitting the first power decision pilot.

23. An apparatus for wireless communications, comprising:
at least one processor configured to:
receive, from a first base station, a request to transmit a first power decision pilot;
determine a first set of time-frequency resources to use for transmitting the first power decision pilot, the first set of time-frequency resources including a fraction of time-frequency resources available for transmission;
transmit, based on receiving the request, the first power decision pilot on the first set of time-frequency resources in a first time period to indicate a first transmit power level to use for data transmission in a second time period after the first time period;

receive, from a second base station, an uplink grant based at least in part on the first power decision pilot and a second power decision pilot from another apparatus; and transmit, to the second base station, data in accordance with the uplink grant; and a memory coupled with the at least one processor.

24. The apparatus of claim 23, wherein the another apparatus is an interfering UE.

25. The apparatus of claim 23, wherein the at least one processor is further configured to:

determine a second transmit power level for the first power decision pilot based on the first transmit power level to use for data transmission in the second time period, and wherein the first power decision pilot is transmitted at the second transmit power level determined for the first power decision pilot.

26. The apparatus of claim 23, wherein the at least one processor is further configured to:

determine a first set of resource elements; and transmit the first power decision pilot on the first set of resource elements.

27. The apparatus of claim 23, wherein the at least one processor is further configured to:

determine a first set of resources to use for transmitting the first power decision pilot in at least one Single-Carrier Frequency Division Multiple Access (SC-FDMA) symbol; and transmit the first power decision pilot on the first set of resources in the at least one SC-FDMA symbol.

28. The apparatus of claim 23, wherein the at least one processor is further configured to:

generate a sequence of symbols identifying the apparatus transmitting the first power decision pilot; and map the sequence of symbols to the first set of time-frequency resources to use for transmitting the first power decision pilot.

29. A non-transitory computer readable medium for wireless communications having instructions stored thereon, the instructions comprising:

one or more instructions which, when executed by a processor of an apparatus, cause the processor to:

receive, from a first base station, a request to transmit a first power decision pilot;

determine a first set of time-frequency resources to use for transmitting the first power decision pilot, the first set of time-frequency resources including a fraction of time-frequency resources available for transmission;

transmit, based on receiving the request, the first power decision pilot on the first set of time-frequency resources in a first time period to indicate a first transmit power level to use for data transmission in a second time period after the first time period;

receive, from a second base station, an uplink grant based at least in part on the first power decision pilot and a second power decision pilot from another apparatus; and transmit, to the second base station, data in accordance with the uplink grant.

30. A method for wireless communication by a base station, comprising:

transmitting, to an interfering user equipment (UE), a power decision pilot request;

receiving at least one power decision pilot from at least the interfering UE on a set of time-frequency resources in a first time period, wherein each power decision pilot indicates a transmit power level to use for data transmission in a second time period after the first time period by the interfering UE transmitting the power decision pilot;

estimating channel quality in the second time period based at least in part on the at least one power decision pilot received in the first time period;

transmitting, to a served UE, an uplink grant based at least in part on the at least one power decision pilot and a second power decision pilot received from the served UE; and receiving data, from the served UE, in accordance with the uplink grant.

31. The method of claim 30, further comprising:

receiving a second power decision pilot from the served UE.

32. The method of claim 30, wherein the estimating the channel quality comprises:

estimating interference due to the interfering UE in the second time period based at least in part on the power decision pilot received from the interfering UE in the first time period, and estimating channel quality in the second time period based at least in part on estimated interference from the interfering UE in the second time period.

33. An apparatus for wireless communications, comprising:

means for transmitting, to an interfering user equipment (UE), a power decision pilot request;

means for receiving at least one power decision pilot from at least the interfering UE on a set of time-frequency resources in a first time period, wherein each power decision pilot indicates a transmit power level to use for data transmission in a second time period after the first time period by the interfering UE transmitting the power decision pilot;

means for estimating channel quality in the second time period based at least in part on the at least one power decision pilot received in the first time period;

means for transmitting, to a served UE, an uplink grant based at least in part on the at least one power decision pilot and a second power decision pilot received from the served UE; and means for receiving data, from the served UE, in accordance with the uplink grant.

34. The apparatus of claim 33, further comprising:

means for receiving a second power decision pilot from the served UE.

35. The apparatus of claim 33, wherein the means for estimating the channel quality comprises:

means for estimating interference due to the interfering UE in the second time period based at least in part on the power decision pilot received from the interfering UE in the first time period, and means for estimating channel quality in the second time period based on estimated interference from the interfering UE in the second time period.

36. An apparatus for wireless communications, comprising:

at least one processor configured to:

transmit, to an interfering user equipment (UE), a power decision pilot request;

receive at least one power decision pilot from at least the interfering UE on a set of time-frequency resources in a first time period, wherein each power decision pilot indicates a transmit power level to use for data transmission in a second time period after the first time period by the interfering UE transmitting the power decision pilot;
estimate channel quality in the second time period based at least in part on the at least one power decision pilot received in the first time period;
transmitting, to a served UE, an uplink grant based at least in part on the at least one power decision pilot and a second power decision pilot received from the served UE; and
receive data, from the served UE, in accordance with the uplink grant; and
a memory coupled with the at least one processor.

37. The apparatus of claim 36, wherein the at least one processor is further configured to:
receive a second power decision pilot from the served UE.

38. The apparatus of claim 36, wherein estimating the channel quality comprises:
estimating interference due to the interfering UE in the second time period based at least in part on the power decision pilot received from the interfering UE in the first time period, and
estimating channel quality in the second time period based at least in part on estimated interference from the interfering UE in the second time period.

39. A non-transitory computer readable medium for wireless communications having instructions stored thereon, the instructions comprising:
one or more instructions which, when executed by a processor, cause the processor to:
transmit, to an interfering user equipment (UE), a power decision pilot request;
receive at least one power decision pilot from at least the interfering UE on a set of time-frequency resources in a first time period, wherein each power decision pilot indicates a transmit power level to use for data transmission in a second time period after the first time period by the interfering UE transmitting the power decision pilot;
estimate channel quality in the second time period based at least in part on the at least one power decision pilot received in the first time period;
transmit, to a served UE, an uplink grant based at least in part on the at least one power decision pilot and a second power decision pilot received from the served UE; and
receive data, from the served UE, in accordance with the uplink grant.

* * * * *